United States Patent [19]
Beierlein

[11] Patent Number: 5,617,463
[45] Date of Patent: Apr. 1, 1997

[54] X-RAY DIAGNOSTIC INSTALLATION

[75] Inventor: Rainer Beierlein, Spardorf, Germany

[73] Assignee: Siemens Aktiengesellschaft, Munich, Germany

[21] Appl. No.: 568,568

[22] Filed: Dec. 7, 1995

[30] Foreign Application Priority Data

Feb. 20, 1995 [DE] Germany .................. 195 05 729.5

[51] Int. Cl.$^6$ ..................................................... H05G 1/64
[52] U.S. Cl. .................................... 378/98.3; 378/98.9
[58] Field of Search ........................... 378/98.2, 98.3, 378/98.9

[56] References Cited

U.S. PATENT DOCUMENTS

| | | | |
|---|---|---|---|
| 4,503,460 | 3/1985 | Skelbitz | 378/98.8 |
| 4,504,859 | 3/1985 | Grady et al. | 378/98.2 |
| 4,561,015 | 12/1985 | Korch | 358/44 |
| 4,946,238 | 8/1990 | Sashin et al. | 378/98.8 |
| 5,119,201 | 6/1992 | Blechinger et al. | 358/209 |
| 5,412,705 | 5/1995 | Snoeren et al. | 378/98.3 |
| 5,523,554 | 6/1996 | Hassler et al. | 250/208.1 |
| 5,559,850 | 9/1996 | Nekovar et al. | 378/98.8 |

FOREIGN PATENT DOCUMENTS 3932845 4/1991 Germany .

OTHER PUBLICATIONS

"A High–Resolution Staggered–Configuration CCD Imager Overlaid with an a–Si–H Photoconductive Layer", Harada et al., IEEE Trans. on Electron Devices, vol. Ed. 32, No. 8, Aug. 1985, pp. 1499–1504.

*Primary Examiner*—David P. Porta
*Assistant Examiner*—David Vernon Bruce
*Attorney, Agent, or Firm*—Hill, Steadman & Simpson

[57] ABSTRACT

An x-ray diagnostic installation has an x-ray source for generating an x-ray beam, an x-ray image converter for acquiring an x-ray image that includes a scintillator layer and a detector with photoelements arranged matrix-like, and a playback system connected thereto for the playback of the x-ray image. The x-ray image converter also includes an array of a number of optical elements arranged between the scintillator layer and the image converter. This array can be composed of micro-lenses or micro-objectives lens elements. A respective micro-lens is allocated to each photoelement of the detector or a respective micro-objective lens elements is allocated to a group of photoelements of the detector.

15 Claims, 2 Drawing Sheets

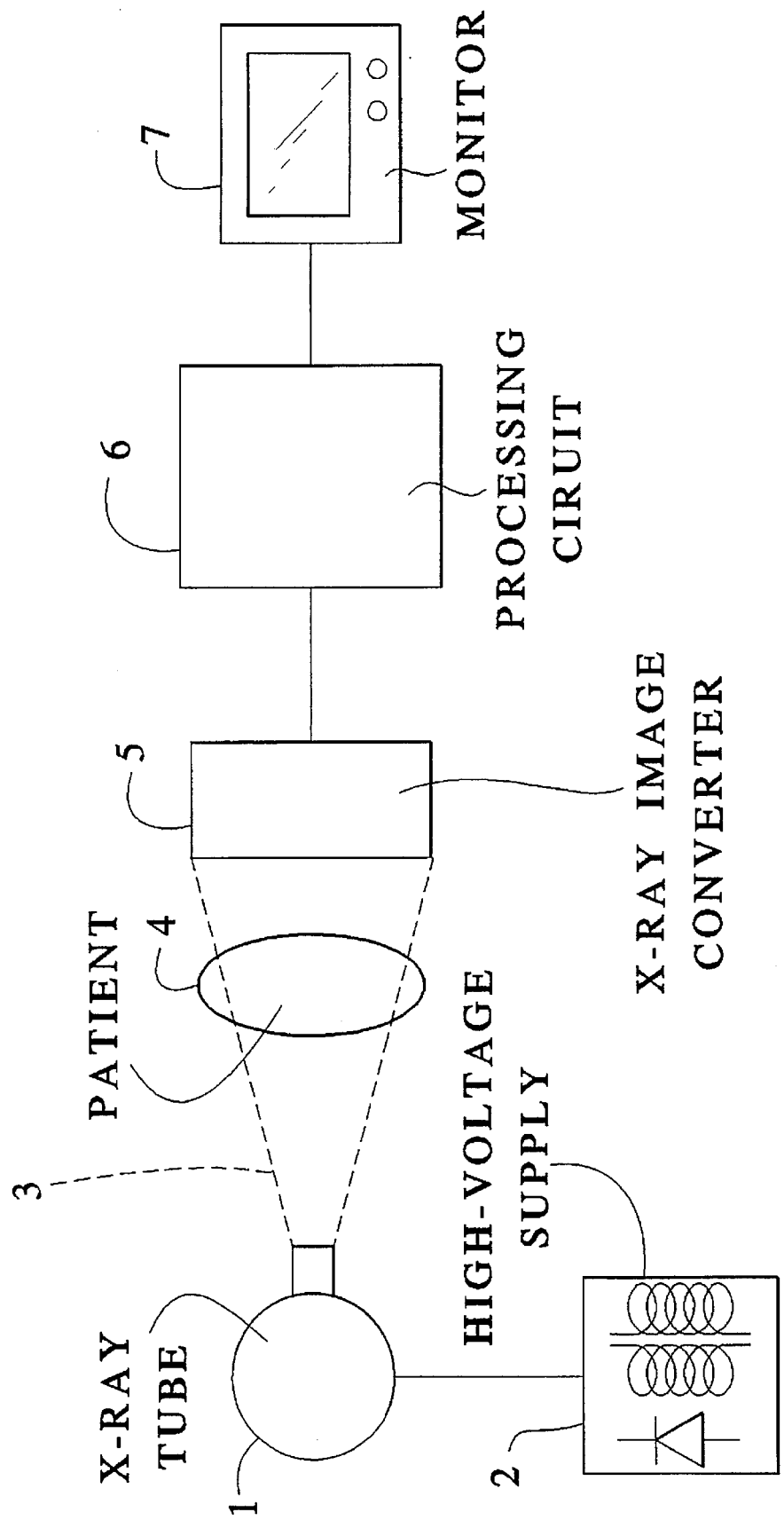

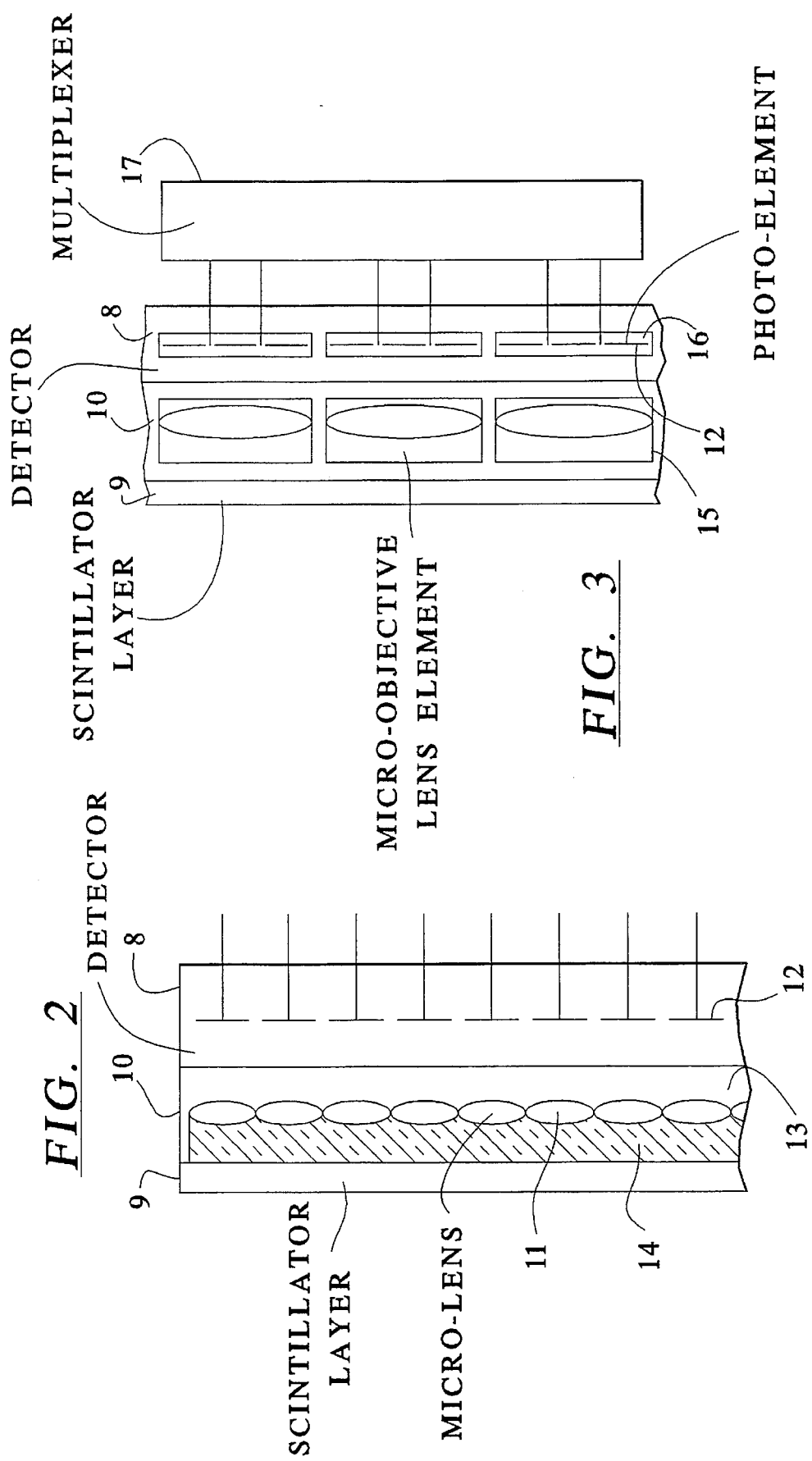

X-RAY DIAGNOSTIC INSTALLATION

BACKGROUND OF THE INVENTION

1. Field of the Invention

The present invention is directed to an x-ray diagnostic installation of the type having an x-ray source for generating an x-ray beam, an x-ray image converter for acquiring an x-ray image that includes a scintillator layer and a detector layer wherein photoelements are arranged matrix-like, and playback system connected to the image converter for the playback of the x-ray image.

2. Description of the Prior Art

It is known, for example, to employ a solid state image converter as the image converter in x-ray diagnostics installations of the above-described type.

German OS 43 21 789 discloses such an x-ray diagnostic installation wherein the x-ray image converter how a photodiode matrix on which a scintillator layer that converts the X-radiation into light is applied.

U.S. Pat. No. 4,503,460 discloses an x-ray diagnostic installation wherein different, overlapping regions of the output luminescent screen of an x-ray image intensifier are imaged via a number of lenses onto image converters allocated to the respective regions. In a following circuit, the output signals of the image converters are combined to form a video signal that encompasses the entire output image of the x-ray image intensifier.

A long focal length is required because of the large field of view given the use of a lens or a number of lenses in an x-ray diagnostic installation of the type initially described, without an x-ray image intensifier, so that large, expensive lenses that are difficult to correct are necessary given the high luminosities required.

SUMMARY OF THE INVENTION

An object of the present invention is to provide an x-ray diagnostic installation with an x-ray image converter of the type initially described which has a flat format, can be economically manufactured and enables an enhanced light yield.

This object is achieved in an x-ray image converter constructed in accordance with the principles of the present invention wherein a matrix-shaped array of a number of optical elements are arranged between the scintillator layer and an image sensor of the image converter. An extremely flat x-ray image converter with high light yield is thereby obtained. Only extremely small fields of view are covered due to the use of a number of optical elements, so that only small optical elements with short focal length are required, these being easy and economical to manufacture. For example, optical elements known from CD technology can be employed, these being extremely inexpensive to acquire since they are mass-produced goods.

It has proven advantageous for the array to comprise micro-lenses or micro-objectives as optical micro-elements, whereby a respective micro-lens can be allocated to each photoelement of the image converter, or a respective micro-objective can be allocated to a group of photoelements.

It has proven advantageous for the image converter to be an aSi:H detector and for the photoelements of the image converter to be photodiodes or photoelements of CCD image sensors.

The optical elements can be inventively secured to a glass carrier, can be worked into a carrier of glass or plastic, or can be embedded in an optical adhesive.

Inventively, the optical elements can be joined to the scintillator layer or to the image converter, for example with an optical adhesive.

DESCRIPTION OF THE DRAWINGS

FIG. 1 is an example, in block diagram form, of an x-ray diagnostic installation of the prior art.

FIG. 2 is a schematic side view, partly in section, of an x-ray image converter constructed in accordance with the principles of the present invention, suitable for use in an x-ray diagnostics installation of the type shown in FIG. 1.

FIG. 3 is a schematic side view of a further embodiment of an inventive x-ray image converter.

DESCRIPTION OF THE PREFERRED EMBODIMENTS

FIG. 1 shows a known x-ray diagnostic installation having an x-ray tube 1 that is driven by a high-voltage generator 2. The x-ray tube 1 emits an x-ray beam 3 that penetrates a patient 4 and is incident as an x-ray image to an x-ray image converter 4, attenuated according to the transparency of the patient 4. The x-ray image converter 5 is connected to a playback system that includes a processing circuit 6 and a monitor 7 connected thereto for playback of the x-ray image. In a known way, the processing circuit 6 can employ transducers, differentiating units and image memories.

In such an x-ray diagnostic installation, the x-ray image converter 5 can, as shown in FIG. 2, include a detector 8 composed of a photodiode matrix or of one or more CCD image sensors. A scintillator layer 9 of a phosphor sensitive to x-rays that converts the X-radiation into light is applied on this detector 8. The detector 8 can be composed of hydrogenous amorphous silicon (aSi:H) and the scintillator layer 9 can be composed of cesium iodide (CsI).

FIG. 2 shows such an x-ray image converter 5 wherein an array 10 of a number of micro-lenses 11 as optical micro-elements is inventively arranged between the detector 8 and scintillator layer 9, these optical micro-elements imaging the x-ray image visible on the scintillator layer 9 onto the photoelements of the detector 8, the photodiodes. As shown in FIG. 2, a micro-lens can be allocated to each photoelement 12. The micro-lenses 11 are worked into (contained or "potted" in) a substrate 14 of glass or plastic and this substrate 14 can be secured, as shown, to the scintillator layer 9 or to the detector 8. A layer having a refractive index differing from that of the substrate 14, for example an air layer 13, is provided at the side of the micro-lenses 11 of the array 10. In such a microptic plate or panel, the micro-lenses 11 can either be cut by a laser or can be injected-molded as parts of the plastic plate or panel.

FIG. 3 shows another embodiment wherein a layer having many micro-objective lens elements 15 as optical micro-elements is arranged between the detector 8 and the scintillator layer 9, this layer of micro-objective lens elements 15 imaging the x-ray image of the scintillator layer 9 onto the detector 8. Each micro-objective lens element 15 images the image plane onto a region 16 CCD image sensor of the detector 8 that includes a number of photoelements 12. The outputs of the regions 16 of the CCD image sensors are supplied to a multiplexer 17 that combines the picture elements in a positionally correct manner. Mass-produced products can be utilized by employing a number of commercially obtainable, inexpensive CCD chips as the detector 8 and a number of CD optical elements known for the scanning of a compact disc as the micro-objectives lens elements 15.

The micro-lenses 11 or the micro-objective lens elements 15 can be embedded in an optical adhesive between the scintillator layer 9 and the detector 8 or can be secured to a glass carrier that is arranged between the image converter 8 and the scintillator layer 9. The optical micro-elements can also be inventively worked into a carrier of glass or plastic or can be embedded in an optical adhesive, to from of unit, and this unit can be secured to the scintillator layer 9 or to the detector 8.

As a result of these inventive embodiments, one obtains an x-ray scintillator layer 5 is obtained that can be economically manufactured, that can be implemented extremely flat, and that enables a high light yield.

Although modifications and changes may be suggested by those skilled in the art, it is the intention of the inventor to embody within the patent warranted hereon all changes and modifications as reasonably and properly come within the scope of his contribution to the art.

I claim as my invention:

1. An x-ray diagnostic installation comprising:

an x-ray source which emits an x-ray beam;

an x-ray image converter disposed in said x-ray beam for acquiring an x-ray image of a subject disposed between said x-ray source and said x-ray image converter, said x-ray image converter having a scintillator layer which converts incident x-rays into light and a detector which detects said light, said detector comprising a plurality of photoelements in a matrix-like formation and a matrix-like array of a plurality of optical micro-elements disposed between said scintillator layer and said detector; and means supplied with said x-ray image from said x-ray image converter for playing back said x-ray image.

2. An x-ray diagnostic installation as claimed in claim 1 wherein said array of a plurality of optical micro-elements comprises an array of a plurality of micro-lenses.

3. An x-ray diagnostic installation as claimed in claim 2 wherein each photoelement has one of said micro-lenses respectively allocated thereto.

4. An x-ray diagnostic installation as claimed in claim 1 wherein said array of a plurality of optical micro-elements comprises an array of a plurality of micro-objective lenses.

5. An x-ray diagnostic installation as claimed in claim 4 wherein said photoelements are divided into a plurality of groups, each group consisting of multiple photoelements, and wherein one of said micro-objective lenses is respectively allocated to each group of photoelements.

6. An x-ray diagnostic installation as claimed in claim 1 wherein said detector comprises an aSi:H detector.

7. An x-ray diagnostic installation as claimed in claim 1 wherein said photoelements comprise photodiodes.

8. An x-ray diagnostic installation as claimed in claim 1 wherein said photoelements comprise elements of a CCD image sensor.

9. An x-ray diagnostic installation as claimed in claim 1 further comprising a glass carrier to which said optical micro-elements are attached.

10. An x-ray diagnostic installation as claimed in claim 1 comprising a substrate into which said optical micro-elements are formed.

11. An x-ray diagnostic installation as claimed in claim 10 wherein said substrate comprises a glass substrate.

12. An x-ray diagnostic installation as claimed in claim 10 wherein said substrate comprises a plastic substrate.

13. An x-ray diagnostic installation as claimed in claim 1 comprising optical adhesive in which said optical micro-elements are embedded.

14. An x-ray diagnostic installation as claimed in claim 1 wherein said optical micro-elements are joined to said scintillator layer.

15. An x-ray diagnostic installation as claimed in claim 1 wherein said optical micro-elements are joined to said detector.

\* \* \* \* \*